United States Patent [19]

Bogart et al.

[11] Patent Number: 4,791,665

[45] Date of Patent: Dec. 13, 1988

[54] INTER-EXCHANGE CARRIER ACCESS SELECTION FEATURE FOR A PBX USER

[75] Inventors: Frank J. Bogart, Boulder; Nancy K. S. Modisette, Broomfield, both of Colo.

[73] Assignee: American Telephone and Telegraph Company, AT&T Information Systems, Holmdel, N.J.

[21] Appl. No.: 9,174

[22] Filed: Jan. 30, 1987

[51] Int. Cl.[4] ......................... H04M 3/38; H04M 3/42; H04M 7/14

[52] U.S. Cl. .................................. 379/207; 379/197; 379/221

[58] Field of Search ............... 379/221, 220, 207, 201, 379/112, 113, 128, 197, 196

[56] References Cited

U.S. PATENT DOCUMENTS 4,565,903  1/1986  Riley .................................. 379/220
4,685,127  8/1987  Miller et al. ....................... 379/221

OTHER PUBLICATIONS

"GTE Private Interconnect Networks", N. Shaye, conference paper, NTC, New Orleans 1981, pp. 1-8.
"Gazing into the SPC Network Future Reveals Vista of New Features", Gorden and Hughes, *Telephony*, Feb. 21, 1983, pp. 86-93.

*Primary Examiner*—Thomas W. Brown
*Attorney, Agent, or Firm*—John C. Moran

[57] ABSTRACT

This feature provides the telephone communication system with the capability to automatically select one of a plurality of inter-exchange carriers to serve an inter-exchange call originated by a telephone communication system user. In response to an inter-exchange call origination, the telephone communication system selects the appropriate and most economical inter-exchange carrier and then outpulses the inter-exchange carrier access code, the user's personal identification code and the called party number dialed by the user to complete the call.

12 Claims, 4 Drawing Sheets

FIG. 2

CALL PROGRESS TABLE

| CALLING STATION NUMBER | CALLED STATION NUMBER | CARRIER IDENTIFICATION | DELETED DIGITS | INSERTED DIGITS |
|---|---|---|---|---|
| 106-0 | 303 416 1080 | 303 | 771 | 902 |
| ⋮ | ⋮ | ⋮ | ⋮ | ⋮ |

ROUTE SELECTION TABLE

| CALLED STATION NUMBER | TIME OF DAY | CARRIER IDENTIFICATION | ROUTE SELECTION (TRUNK) | ALTERNATE ROUTE SELECTION |
|---|---|---|---|---|
| 303 416 XXXX | B | 902 | 115 | 116 |
| 303 416 XXXX | A | 638 | 116 | 115 |
| 201 949 XXXX | C | 428 | 118 | 116 |
| 201 949 XXXX | B | 190 | 116 | 115 |
| 201 949 XXXX | A |  | 115 | 116 |
| ⋮ | ⋮ | ⋮ | ⋮ | ⋮ |

CALLING STATION CARRIER INFORMATION TABLE

| CALLING STATION IDENTITY | PERSONAL I.D. CODE | CARRIER SPECIFICATION CAPABILITY | PRE-DESIGNATED CARRIER IDENTIFICATION | ROUTE FOR IDENTIFIED CARRIER |
|---|---|---|---|---|
| 106-0 | 927 | 1 | 902 | 115 |
| ⋮ | ⋮ | ⋮ | ⋮ | ⋮ |
| 106-N | 717 | 0 | 902 | 115 |

IXC MANIPULATION TABLE

| SELECTED ROUTE | DELETE X NUMBER OF DIGITS | INSERT DIGITS FOR CARRIER | DIGIT OUTPULSING FORMAT |
|---|---|---|---|
| 115 | 3 | — | T |
| 116 | 3 | — | T |
| 117 | 4 | — | T |
| 118 | 3 | — | R |
| ⋮ | ⋮ | ⋮ | ⋮ |

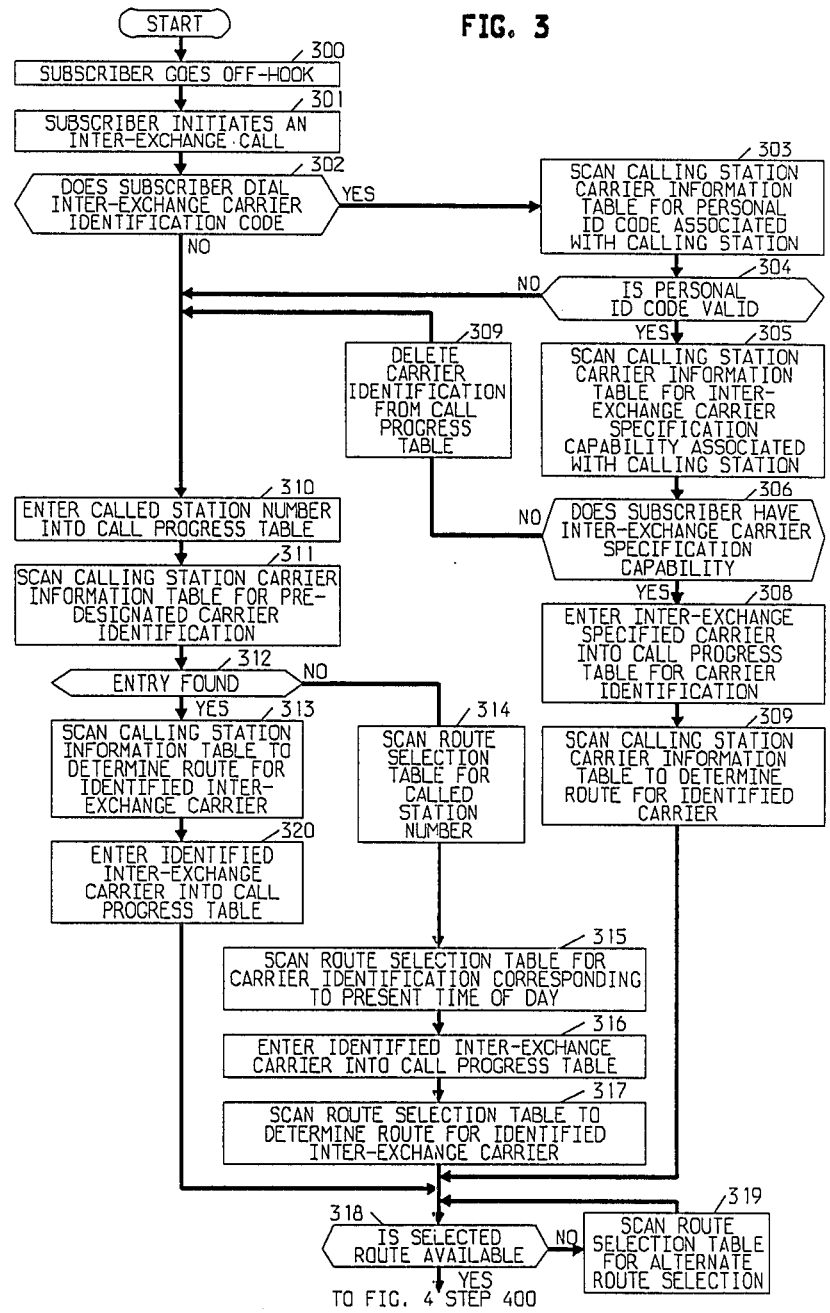

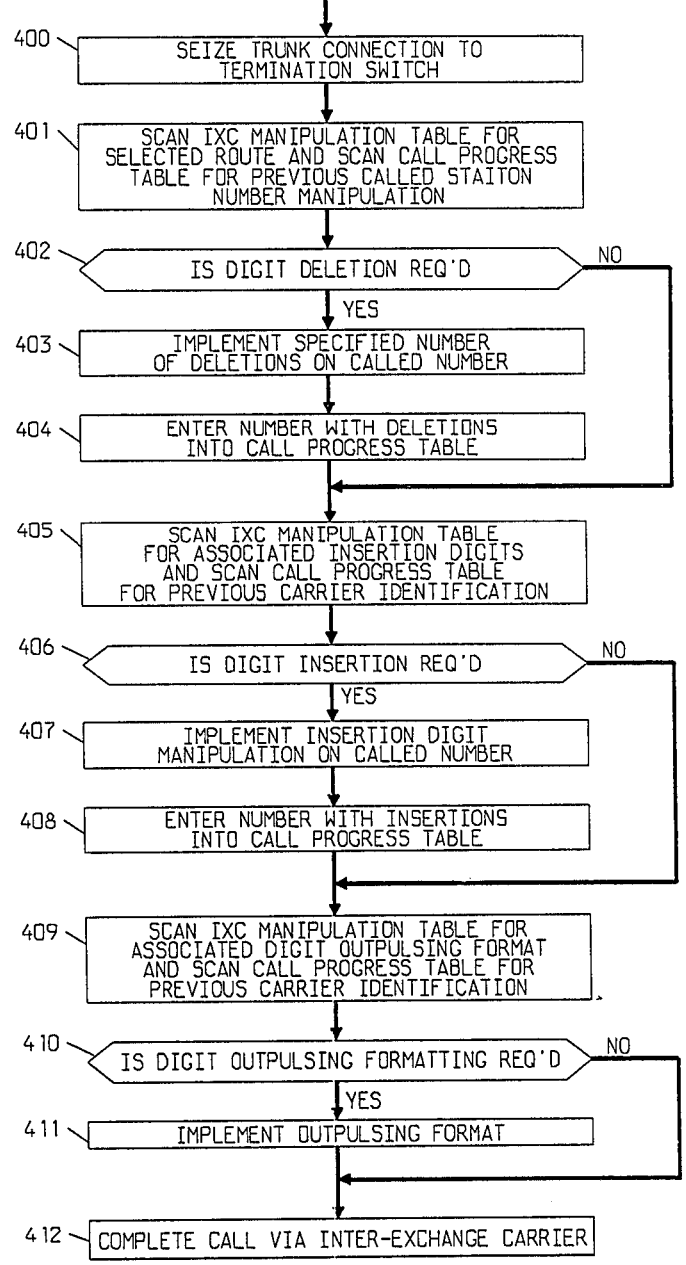

INTER-EXCHANGE CARRIER ACCESS SELECTION FEATURE FOR A PBX USER

CROSS-REFERENCE TO RELATED APPLICATION

The following U.S. applications, which are assigned to the same assignee as the instant application and filed concurrently therewith, has related subject matter:

(1) "Inter-Exchange Carrier Access" of R. J. Billinger, L. K. Dotter, T. D. Gasaway, D. W. Herrick and S. W. Johnson, application Ser. No. 009,178.

(2) "Communication Facilities Access Control Arrangement" of R. J. Billinger, L. K. Dotter and T. D. Gasaway, application Ser. No. 009,175.

TECHNICAL FIELD

This invention relates to telephone communication systems (PBXs) and, in particular, to an arrangement in the telephone communication system which automatically performs the inter-exchange carrier selection function for a telephone communication system user. The telephone communication system user originates a long distance call by dialing the called party number. The telephone communication system then selects an inter-exchange carrier to serve the long distance call and outpulses the dialed number, the inter-exchange carrier access code and the user authorization code to complete the call for the user.

PROBLEM

In the field of telephone communications, a geopolitical area, such as the United States, is divided into a plurality of contiguous, non-overlapping districts, called exchanges, each of which is served by a local telephone company. The exchanges are also referred to as Local Access Transport Areas (LATAs). Telephone calls originating and terminating within the same exchange, referred to as intra-exchange calls, are handled end-to-end by a local, intra-exchange, telephone company. Calls originating within one exchange or in a foreign country and terminating in a different exchange or in a foreign country, referred to as inter-exchange calls, are handled at each end by the intra-exchange company that services the originating and the terminating exchanges. These inter-exchange calls are carried between the intra-exchange companies by one or more inter-exchange carriers.

Typically, a caller places an inter-exchange call through a pre-subscribed inter-exchange carrier such that the caller merely dials the number of a called party. However, it is a problem to utilize other inter-exchange carriers, since the caller must dial special access codes that are assigned to each inter-exchange carrier. The caller, once connected to a selected inter-exchange carrier, must also dial a personal identification code and the number of the called party to have the call completed. With the proliferation of inter-exchange carriers, carrier selection is often difficult for a telephone communication system user. The user may be unaware of which inter-exchange carrier is the most economical for a particular time of day, which inter-exchange carrier serves the user's telephone communication system or what access codes are appropriate for the particular inter-exchange carriers available to the user's telephone communication system. It would be advantageous if a telephone communication system user was given equal access to all inter-exchange carriers. The telephone communication system could eliminate the need for the user to dial an access code and the user personal identification code to originate an inter-exchange call.

SOLUTION

The above problems are solved and a technical advance in the field is achieved by providing an automatic inter-exchange carrier access selection feature for a telephone communication system user. This feature provides the telephone communication system with the capability to automatically select one of a plurality of inter-exchange carriers to serve an inter-exchange call originated by a telephone communication system user. In response to an inter-exchange call origination, the telephone communication system selects the appropriate and most economical inter-exchange carrier and then outpulses the inter-exchange carrier access code, the user's personal identification code and the called party number dialed by the user to complete the call.

A data base is included in the main memory of the telephone communication system processor. The data base contains information on the various inter-exchange carrier billing rates based on time of day and destination. In addition, the data base provides the personal identification code for each calling party served by the PBX and the inter-exchange carrier access codes. When a calling party originates an inter-exchange call, the telephone communication system switch processor uses the called number, the time of day, and the identity of the calling party to select an inter-exchange carrier and establish a call connection to the selected inter-exchange carrier. The telephone communication system processor provides the calling party's personal identification code to the selected inter-exchange carrier which then serves the call.

BRIEF DESCRIPTION OF THE DRAWING

These and other advantages of the invention may be better understood from a reading of the following description of one possible exemplary embodiment taken in conjunction with the drawings in which:

FIG. 2 illustrates the logical memory structure of a telephone communication system; and FIGS. 3–4 illustrate a flow chart which defines the processing steps required to implement the carrier selection feature.

DETAILED DESCRIPTION

Figure 1:
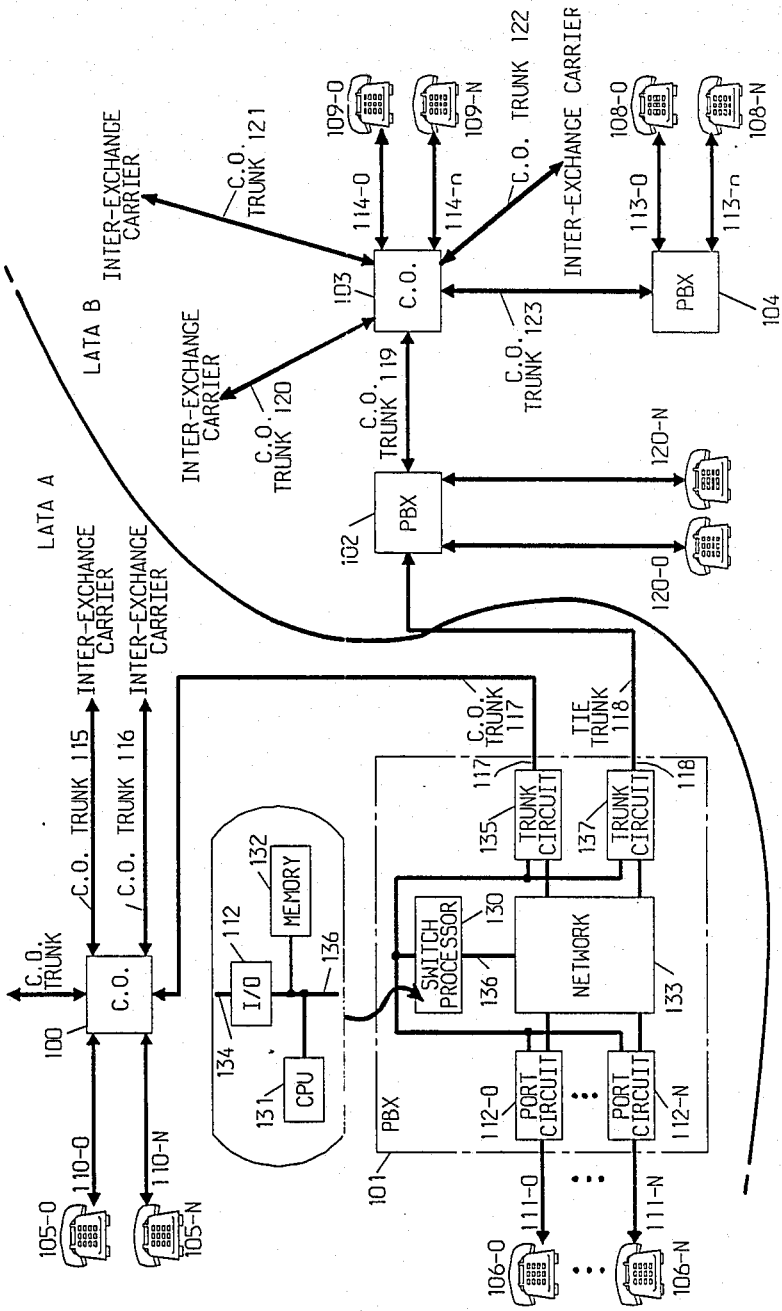
FIG. 1 illustrates a simplified block diagram of a telephone network.

FIG. 1 illustrates a simplified version of a representative telephone network. The details of the configuration and operation of an illustrative network of this nature are described in "Notes on the Network", Issue 2, published in December 1980 by American Telephone and Telegraph Company. Reference may be made to this publication for a detailed understanding of the conventional features of the telephone network.

The geopolitical area served by the telephone network is divided into a plurality of contiguous nonoverlapping geographical areas called exchanges, represented in FIG. 1 by LATA A, LATA B. Each exchange is served by central switching offices labeled C.O.s (100, 103). Central switching office 100 is connected over C.O. trunks 115 and 116 to two different inter-exchange carriers. Additionally, central switching office 103 is connected to other inter-exchange carriers over C.O. trunks 120, 121 and 122. Typically, the central switching offices are interconnected to these inter-exchange carriers by one or more trunk groups. The single trunk shown in FIG. 1 is merely representative in nature.

Subscribers to the services of an inter-exchange carrier have their telephone station sets connected to various central switching offices 100, 103 of the operating company or to telephone communication systems 101, 102, 104 such as those shown in FIG. 1. The subscriber telephone station sets may comprise a wide variety of equipment. A telephone station set may be, for example, a conventional voice telephone station set, a pay telephone set, a personal computer or a terminal. Connections between subscriber telephone station sets and a telephone communication system are via lines and trunks which will commonly be referred to herein as paths.

Intra-exchange switching offices that merely switch communication paths between telephone station sets and trunks or other telephone station sets are referred to as end offices. In FIG. 1 the end offices are central switching office 103 and central switching office 100. Certain end offices have direct trunk connection to inter-exchange carriers such as central switching office 103 and central switching office 100. Telephone communication systems on the other hand have no direct connection to inter-exchange carriers but must rely on the central switching office to which they are connected to provide the interconnection to an inter-exchange carrier.

Because there may be more than one inter-exchange carrier available to a telephone subscriber via the associated central switching office, each subscriber can, but is not required to, identify an inter-exchange carrier as that subscriber's primary inter-exchange carrier. The primary inter-exchange carrier may be an inter-exchange carrier, an international carrier, or a combined inter-exchange and international carrier. Though identifying a primary inter-exchange carrier is not mandatory, such designation is necessary if the subscriber wishes to use conventional 7 or 10 digit dialing to reach a subscriber in another exchange.

A subscriber further has the option of accessing any inter-exchange carrier for any particular call by dialing an inter-exchange carrier identification code as a prefix to the called number. The inter-exchange carrier identification code is a set of digits and it could be any predetermined number of digits. In this illustrative example, it is assumed that 3 digits are generally used for inter-exchange carrier identification. The inter-exchange carrier identification code is identified herein as xxx.

Optionally, a subscriber may also be allowed to select a carrier for inter-exchange calls via the conventional scheme of dialing 10xxx where equal access is available or 950-1xxx where equal access is not available, with the 3 digits xxx used to identify the desired inter-exchange carrier. The xxx codes may include the 0xx codes currently used in 950-1xxx dialing. This current scheme is modified to expand to 950-1xxx dialing so as to achieve consistency in the various methods available for inter-exchange carrier identification.

TELEPHONE COMMUNICATION SYSTEM 101

The majority of logic, control, storage, supervisory and translation functions required for the operation of each telephone communication system (e.g.—101) are performed by a switch processor 130. Switch processor 130 includes a central processing unit (CPU) 131, which might be any of a number of commercially available processors. Central processing unit 131 uses instructions and data stored in memory 132, to control the major operations of telephone communication system 101. In particular, central processing unit 131 controls the operations of switching network 133 by means of digital communication channel 134.

Switching network 133 is a digital time division switching network that provides time-slot interconnections between internal telephone station sets, such as 106-0 to 106-N, and between the internal telephone station sets and trunk circuits 117 to a local central switching office 100. Each of the internal telephone station sets and trunk circuits connect to switching network 133 by means of interface port circuits 112-0 to 112-N and 135 respectively. Central processing unit 131 communicates with the internal telephone station sets and trunks by means of these port circuits via digital communication channel 136.

SWITCH PROCESSOR MEMORY STRUCTURE

FIG. 2 discloses the details of the memory structure of switch processor 130 that is required to execute the inter-exchange carrier selection feature. In particular, FIG. 2 illustrates a call progress table, a route selection table, a calling station carrier information table, and an inter-exchange carrier (IXC) manipulation table. The following description briefly identifies the function of each of these tables. Further details of each table are provided with respect to the flow charts illustrated in FIGS. 3 through 5.

The call progress table of FIG. 2 indicates the call processing status of a call between a calling and a called station. For ease of description, all such information normally recorded in the call progress table that is not pertinent to the disclosed invention has been eliminated from this discussion. The called station number is included in the call progress table, as is the identification of the inter-exchange carrier that is associated with that called station. Entries in the call progress table also define the deleted and inserted digits portion of the call progress table and these entries are discussed subsequently.

The route selection table is included in the memory structure in order to select the appropriate route to a particular central switching office as a function of the time of day. In particular, the route selection table defines which inter-exchange carrier is the most economical for this time of day such that an appropriate route selection may be made between the calling and the called stations. If the selected route is not available, an alternate route or inter-exchange carrier is selected as designated by the route selection table.

The calling station carrier information table is the table required to implement the inter-exchange carrier selection feature. In particular, the calling station carrier information table contains information which contains the identity of the calling station, the personal ID code typically associated with that calling station, whether or not that calling station has the capability of specifying an inter-exchange carrier and if so what inter-exchange carrier has been pre-designated. Additionally the table contains information for routing to that identified inter-exchange carrier. That table is permanently stored in memory so as to provide the appropriate information required to execute the inter-exchange carrier selection feature.

The IXC manipulation table is another table pertinent to the disclosed invention. In particular, the IXC manipulation table provides the appropriate formatting of digits with respect to the called station number. In order to reach a particular called station at the end of a selected route, the called station number must be manipulated to delete and/or insert digits as appropriate to reach a particular inter-exchange carrier as selected by the telephone communication system switch processor. In addition, in order to select the appropriate inter-exchange carrier, the digit outpulsing of a called number following deletion and/or insertion manipulation must conform to a specific format in order for the appropriate inter-exchange carrier to be received. Further details are described subsequently.

CALL ORIGINATION

The above described FIG. 2 indicates the memory structure stored in memory 132 required to implement the inter-exchange carrier selection feature. The following description provides more detail with respect to each of the above-outlined tables and with respect to the implementation of the inter-exchange carrier selection feature as provided by the telephone communication system for each telephone communication system subscriber. FIGS. 3 through 5 illustrate in flow chart form the steps required to implement the inter-exchange carrier selection feature.

Assume for the purpose of this description that a subscriber at telephone station set 106-0 on telephone communication system 101 originates a call to telephone station set 108-0 at telephone communication system 104. At step 300, the telephone communication system subscriber goes off hook on telephone station set 106-0. The subscriber then originates an outgoing inter-exchange call at step 301 in response to a received dial tone from the telephone communication system switch processor 130. The inter-exchange carrier selection for this outgoing inter-exchange call can be accomplished in one of two ways. At step 302 the subscriber can elect to dial an inter-exchange carrier identification code (902) along with the subscriber's personal identification code and the called station number (303 416 1080). If the subscriber does not dial the inter-exchange carrier identification code at step 302, call processing advances to step 310. However, assume for the moment, that the subscriber does dial an inter-exchange carrier identification code (902). Call processing then advances to step 303.

At step 303 central processing unit 131 of the telephone communication system scans the calling station carrier information table stored in memory 132 to locate the memory entries associated with the calling station identity. The identity of the calling station (1060) defines the particular parameters associated with that calling station. At step 303, central processing unit 131 scans the calling station carrier information table entries associated with calling station 1060 to identify the associated personal identification code (927). At step 305, central processing unit 131 compares the personal identification code dialed by the subscriber with the personal identification code retrieved from memory 132 to determine whether the dialed code is valid. If a valid personal identification code is not found at step 304, then call processing advances to step 310 which is discussed subsequently. However, assume there is a valid personal identification code associated with calling station 1060. Call processing advances to step 305 where central processing unit 131 scans the calling station carrier information table stored in memory 132 to retrieve the carrier specification capability entry associated with calling station 1060. Central processing unit 131 determines at step 306 whether calling station 1060 has the authorization to specify a particular inter-exchange carrier. If the subscriber is not authorized to specify one of the inter-exchange carriers then central processing unit 131 deletes the personal identification code for calling station 1060 from the call progress table at step 307 and call processing advances to step 311 discussed subsequently. However, if the subscriber does have the authorization to specify an inter-exchange carrier as indication by a 1 stored in the carrier specification capability column, call processing advances to step 308. At 308 the switch processor central processing unit 131 scans the calling station carrier information table to determine the route (115) for the identified inter-exchange carrier (902), i.e., which trunk group is appropriate to reach that specified inter-exchange carrier. Call processing then advances to step 318 which is described subsequently.

DEFAULT SELECTION OF INTER-EXCHANGE CARRIER

Assume that steps 302 through 309 have been omitted because either the subscriber did not dial a carrier identification code and a valid personal identification code, or the subscriber did not have carrier specification capability or the subscriber simply dials the called station number. At step 310 central processing unit 131 enters the called station number (303 416 1080) into the call progress table. Following the identification of the called station number, the switch processor central processing unit 131 at step 311 scans the calling station carrier information table to retrieve the predesignated inter-exchange carrier identification entry associated with calling station 1060. At step 312 central processing unit 131 determines whether a predesignated inter-exchange carrier was designated for calling station 1060. If an entry is found, central processing unit 131 advances to step 313 and scans the calling station carrier information table to determine the route identified for this inter-exchange carrier. At step 320, central processing unit 131 enters the identity of the selected inter-exchange carrier into the call progress table. Call Processing then advances to step 318, described below.

If an inter-exchange carrier has not been designated for calling station 1060, central processing unit 131 selects an inter-exchange carrier. This is done by central processing unit 131 scanning the route selection table to identify the terminating central switching office (303 416) associated with the called station (1080). Call processing then advances to step 315 in response to locating the called station number in the route selection table. FIG. 2 illustrates two table entries associated with the destination central switching office. Each entry specifies an inter-exchange carrier corresponding to a predefined time of day. The route selection table contains time of day entries "A", B", "C". Each of these letter designations correspond to a predefined time period. For example, the designation A may correspond to the "standard work hours" of 9AM to 5PM while the designation B may represent "swing time" of 6AM to 9AM and 5PM to 8PM while the designation C may represent "night hours" of 8PM to 6AM. Central processing unit 131 identifies the one of these three table entries that corresponds to the present time of day and retrieves the carrier identification information associated with this time of day and destination central switching office. At step 316, central processing unit 131 enters the inter-exchange carrier identification into the call progress table. Central processing unit 131 at step 317 scans the route selection table to determine the route assigned to this identified inter-exchange carrier.

The switch processor at step 318 then scans the trunk designated as the selected route to see if the selected route is available, i.e., is the trunk idle. If the trunk is not idle, switch processor central processing unit 131 at step 319 scans the route selection table for an alternate route selection. The switch processor central processing unit 131 repeats steps 318 and 319 until such time as a trunk becomes idle and a route is available to the specific terminating central switching office as identified by the selection of the inter-exchange carrier. Call processing then advances to step 400 following a determination of availability of a selected route.

OUTGOING CALL-DIALED DIGIT MANIPULATION

At step 400 in response to the availability of the selected route, the switch processor central processing unit 131 seizes an available trunk 117 to the serving central switching office 100. At step 401 the switch processor central processing unit 131 scans the IXC manipulation table in memory 132 for the selected route and scans the call progress table for previous called station number manipulation, i.e., did the called number include a personal identification code or a carrier specification code or was the original called number manipulated to pick a different inter-exchange carrier. If the IXC manipulation table for the selected route indicates that no such manipulation is to take place then call processing advances to step 403. However, if digit deletion is required such that a personal identification code or inter-exchange carrier digit manipulation exists then call processing advances from steps 402 to 405. Assume, that at step 402 digit manipulation is required as indicated by the IXC manipulation table. Call processing then advances to step 403. At step 403 the IXC manipulation table indicates the deletion of a particular number of digits and the insertion of a particular number of digits to specify a particular inter-exchange carrier. Following the deletion of a specified number of digits from the called number the new called number with the deletions is entered into the call progress table at step 404. The IXC manipulation table is again scanned in order to determine if any insertion digits are required. In addition, central processing unit 131 scans the call progress table to determine if any previous inter-exchange carrier identification has been determined with respect to the dialed called number. If the inter-exchange carrier identification has been proper at step 405 and call processing advances from 406 to 409. However, if digit insertion is required in order to specify a particular inter-exchange carrier, call processing advances to step 407. In steps 407 and 408 the IXC manipulation table indicates the insertion function and the insertion function specifies a particular set of digits which alter the called station number. This new called station number is then inserted into the call progress table at step 408. Call processing then advances to step 409. At step 409 the switch processor central processing unit 131 scans the IXC manipulation table to determine if there is a particular format following the manipulation of the called station number that is required in order to meet the requirements of a particular inter-exchange carrier identification and access of that particular inter-exchange carrier. Therefore at step 410 call processing determines whether digit outpulsing formatting is required. If digit outpulsing formatting is not required then call processing continues on to FIG. 5 step 500. If digit outpulsing formatting is required as indicated by the IXC manipulation table at step 411, the particular format designated is implemented at step 411. Call processing then advances to step 412. At step 412 the called station number is transmitted to the appropriate inter-exchange carrier as specified by the call progress table and a call is established between the calling station (1060) and the called station (1080) via the identified inter-exchange carrier and normal call processing operations take effect.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a telephone communication system which serves a plurality of stations and which provides access to a plurality of inter-exchange carriers via a telephone central office, a method of providing a calling station with access to one of said inter-exchange carriers, without requiring said calling station to have pre-specified one of said inter-exchange carriers or to have selected one of said inter-exchange carriers at time of inter-exchange call origination, comnprising the steps of:

scanning a database in said telephone communication system in response to a calling party at a calling station dialing a called party number on an inter-exchange call origination to select one of said inter-exchange carriers to serve said call origination;

retrieving from said database access code data associated with said one of said inter-exchange carriers and user authorization code associated with said telephone communication system; and completing a call connection via said telephone central office from said calling party to said selected one of said inter-exchanges carrier using said dialed number and said access code data and said user authorization code.

2. The method of claim 1 wherein said communication system allows preselection of another one of said inter-exchange carriers and said step of scanning includes the step of:

reading from said database the identity of said other one of said inter-exchange carriers preselected by the user at said calling station; and said step of retrieving comprises the step of reading from said database other access code data associated with said other one of said inter-exchange carriers and another user authorization code for use with said other one of said inter-exchange carriers.

3. The method of claim 2 wherein said step of completing includes the steps of:

modifying said called number to match a defined format required by said preselected other one of inter-exchange carriers;

originating an outgoing call connection to said other one of said inter-exchange carriers using said other user authorization code and said other access code data to gain access to said other one of said inter-exchange carriers; and outpulsing said modified called number to said other one of said inter-exchange carriers via said outgoing call connection.

4. The method of claim 1 wherein the step of scanning includes the steps of:

determining the present time of day; and reading from said database said one of said inter-exchange carriers designated for said called number and said present time of day.

5. The method of claim 4 wherein the step of completing includes the steps of:

modifying said called number to match another defined format required by said one of said inter-exchange carriers;

originating an outgoing call connection via said telephone communication switching system to said designated inter-exchange carrier using said access code data and said user authorization code to gain access to said one of said inter-exchange carriers; and outpulsing said modified called number to said designated inter-exchange carrier via said outgoing call connection.

6. The method of claim 1 wherein said communication system allows selection of an inter-exchange carrier at call origination and said step of scanning includes the step of:

verifying, in response to said calling party dialing an inter-exchange carrier access code along with said called number, that said calling station is allowed to select an inter-exchange carrier at the time of inter-exchange call origination.

7. In a telephone communication system which serves a plurality of stations and which provides access to a plurality of inter-exchange via a telephone central office, apparatus for providing a calling station with access to one of said inter-exchange carriers without requiring said calling station to have pre-specified one of said inter-exchange carriers or to have preselected one of said inter-exchange carriers at time of inter-exchange call origination, comprising:

means responsive to a calling party at a calling station dialing a called party number on an inter-exchange call origination for scanning a database in said telephone communication system to select one of said inter-exchange carriers to serve said inter-exchange call origination;

means responsive to said scanning means for retrieving from said database, inter-exchange carrier access data associated with said selected one of said inter-exchange carriers and user authorization code associated with said telephone communiction system; and means responsive to said retrieving means for completing a call connection via said telephone central office from said calling party to said selected one of inter-exchange carriers using said inter-exchange carrier access and said user authorization code data and said called number.

8. The apparatus of claim 7 wherein said communication system allows preselection of another one of said inter-exchange carriers and said scanning means includes:

means for reading from said database the identity of said other one of said inter-exchange carriers preselected by the user at said calling station; and said retrieving means comprises means for reading from said database other access code data associated with said other one of said inter-exchange carriers and another use authorization code for use with said other one of said inter-exchange carriers.

9. The apparatus of claim 8 wherein said completing means includes:

means responsive to said reading means for modifying the dialing format of said called number to match a defined format required by said other one of said inter-exchange carriers;

means responsive to said modifying means for originating an outgoing call connection to said other one of said inter-exchange carriers using said other access code data and said other user authorization code to gain access to said other one of said inter-exchange carriers; and means for outpulsing said modified called number to said other one of said inter-exchange carriers via said outgoing call connection.

10. The apparatus of claim 7 wherein said scanning means includes:

means for determining the present time of day; and means for reading from said database said one of said inter-exchange carriers designated for said called number and said present time of day.

11. The apparatus of claim 10 wherein said completing means includes:

means responsive to said reading means for modifying the dialing format of said called number to match another defined format required by said preselected other one of said inter-exchange carriers;

means responsive to said modifying means for originating an outgoing call connection via said telephone communication switching system to said preselected other one of said inter-exchange carriers using said access code data and said user authorization code to gain access to said one of said inter-exchange carriers; and means for outpulsing said modified called number to said preselected inter-exchange carrier via said outgoing call connection.

12. The apparatus of claim 7 wherein said communication system allows selection of inter-exchange carriers at call origination and said scanning means includes:

means for verifying, in response to said calling party dialing an inter-exchange carrier access code along with said called number, that said calling station is allowed to select an inter-exchange carrier at the time of inter-exchange call origination.

* * * * *